(12) United States Patent
Brucker et al.

(10) Patent No.: US 9,965,633 B2
(45) Date of Patent: May 8, 2018

(54) USING CODE SIMILARITIES FOR IMPROVING AUDITING AND FIXING OF SAST-DISCOVERED CODE VULNERABILITIES

(71) Applicant: SAP SE, Walldorf (DE)

(72) Inventors: Achim D. Brucker, Sheffield (GB); Michael Herzberg, Moeglingen (DE)

(73) Assignee: SAP SE, Walldorf (DE)

( * ) Notice: Subject to any disclaimer, the term of this patent is extended or adjusted under 35 U.S.C. 154(b) by 169 days.

(21) Appl. No.: 14/982,309

(22) Filed: Dec. 29, 2015

(65) Prior Publication Data

US 2017/0185783 A1    Jun. 29, 2017

(51) Int. Cl.
| | |
|---|---|
| *G06F 21/00* | (2013.01) |
| *G06F 21/57* | (2013.01) |
| *G06F 21/55* | (2013.01) |
| *H04L 29/06* | (2006.01) |
| *G06F 21/56* | (2013.01) |

(52) U.S. Cl.
CPC ............ *G06F 21/577* (2013.01); *G06F 21/55* (2013.01); *G06F 21/563* (2013.01); *H04L 63/1433* (2013.01); *G06F 21/562* (2013.01)

(58) Field of Classification Search
None
See application file for complete search history.

(56) References Cited

U.S. PATENT DOCUMENTS

| | | | |
|---|---|---|---|
| 7,603,711 B2 | 10/2009 | Scheidell | |
| 8,325,880 B1 | 12/2012 | Pelland et al. | |
| 8,473,505 B2 | 6/2013 | Brucker et al. | |
| 8,776,239 B2 | 7/2014 | De Keukelaere et al. | |
| 8,881,293 B1 | 11/2014 | Brucker et al. | |
| 8,959,646 B2 | 2/2015 | Brucker et al. | |
| 9,235,716 B1 | 1/2016 | Brucker et al. | |

(Continued)

FOREIGN PATENT DOCUMENTS

WO    WO 2000/067118    11/2000    ............... G06F 9/44

OTHER PUBLICATIONS

Sidiroglou-Douskos, Stelios, et al. "Automatic error elimination by horizontal code transfer across multiple applications." ACM SIGPLAN Notices. vol. 50. No. 6. ACM, 2015.*

(Continued)

*Primary Examiner* — Madhuri Herzog
(74) *Attorney, Agent, or Firm* — Fish & Richardson P.C.

(57) ABSTRACT

Implementations of the present disclosure include methods, systems, and computer-readable storage mediums for receiving results from security testing of source code, each result indicating a potential security vulnerability of the source code, displaying graphical representations of the results to a user, and, by a fix recommendation generator: receiving user input indicating a result of the results, receiving a set of code clones, each code clone being provided based on at least a snippet of the source code underlying the result, receiving a set of repairs, each repair being associated with a code clone, and mitigating a previously determined security vulnerability, and providing a set of fix recommendations based on the set of code clones, the set of repairs, and similarity metrics, each similarity metric indicating a similarity between the at least a snippet of the source code and a respective code clone.

20 Claims, 7 Drawing Sheets

(56) References Cited

U.S. PATENT DOCUMENTS

| | | | |
|---|---|---|---|
| 9,256,757 B2 | 2/2016 | Brucker et al. | |
| 9,286,187 B2 | 3/2016 | Brucker et al. | |
| 9,305,168 B2 | 4/2016 | Brucker et al. | |
| 2008/0120305 A1 | 5/2008 | Sima et al. | |
| 2012/0159434 A1* | 6/2012 | Dang | G06F 8/751 717/120 |
| 2016/0188885 A1* | 6/2016 | Lee | G06F 21/577 726/25 |
| 2017/0286692 A1* | 10/2017 | Nakajima | G06F 21/577 |

OTHER PUBLICATIONS

Jang, Jiyong, Abeer Agrawal, and David Brumley. "ReDeBug: finding unpatched code clones in entire os distributions." Security and Privacy (SP), 2012 IEEE Symposium on. IEEE, 2012.*

Pham, Nam H., et al. "Detection of recurring software vulnerabilities." Proceedings of the IEEE/ACM international conference on Automated software engineering. ACM, 2010.*

Li, Hongzhe, et al. "A scalable approach for vulnerability discovery based on security patches." International Conference on Applications and Techniques in Information Security. Springer, Berlin, Heidelberg, 2014.*

Dang, Yingnong, et al. "XIAO: Tuning code clones at hands of engineers in practice." Proceedings of the 28th Annual Computer Security Applications Conference. ACM, 2012.*

Cesare, Silvio. "Clonewise—Automatically Detecting Package Clones and Inferring Security Vulnerabilities." Black Hat, 2012.*

Kawamitsu, Naohiro, et al. "Identifying source code reuse across repositories using LCS-based source code similarity." Source Code Analysis and Manipulation (SCAM), 2014 IEEE 14th International Working Conference on. IEEE, 2014.*

CodePro Analytix User Guide; Google; extracted from https://developers.google.com/java-dev-tools/codepro/doc/ ; Aug. 18, 2015 (3 pages).

Dobolyi et al.; Harnessing Web-Based Application Similarities to Aid in Regression Testing; 20th International Symposium on Software Reliability Engineering, 20098, ISSRE '09; Institute of Electrical and Electronics Engineers Inc.; extracted from http://ieeexplore.ieee.org/xpl/articleDetails.jsp?arnumber=5362085&tag=1 ; Aug. 18, 2015 (2 pages).

* cited by examiner

US 9,965,633 B2

USING CODE SIMILARITIES FOR IMPROVING AUDITING AND FIXING OF SAST-DISCOVERED CODE VULNERABILITIES

BACKGROUND

Static Application Security Testing (SAST) is an analysis technique for analyzing program code to detect potential problems within the source code. That is, SAST performs such analysis without actually executing (running) the source code. Potential problems with the code can include, for example, potentially insecure dataflows that can endanger either the security of safety of the program. However, static analysis tools (e.g., SAST tools) often over approximate the number of potential insecurities in a program, thus, resulting in many reported findings that are neither security nor safety relevant (e.g., false positives). In general, this leads to the need for complex and dynamic security policies as well as a significant increase in the costs for manual system audits.

In some examples, the inevitable presence of false positives require resources (e.g., processing, memory) to be expended on analysis the results to determine whether a finding reported by the SAST needs to be attended to (e.g., fixed). If a finding requires attention, further resources are expended to attend to the underlying issue. Besides the resource intensive efforts to review the results, a highly skilled expert is also required, which significantly increases the costs SAST analysis.

SUMMARY

Implementations of the present disclosure include computer-implemented methods for integrated security testing and code similarity analysis for modifying source code to mitigate a potential security vulnerability. In some implementations, methods include actions of receiving results from security testing of source code, each result indicating a potential security vulnerability of the source code, displaying graphical representations of the results to a user, receiving, by a fix recommendation generator, user input indicating a result of the results, receiving, by the fix recommendation generator, a set of code clones, each code clone being provided based on at least a snippet of the source code underlying the result, receiving, by the fix recommendation generator, a set of repairs, each repair being associated with a code clone, and mitigating a previously determined security vulnerability, and providing, by the fix recommendation generator, a set of fix recommendations based on the set of code clones, the set of repairs, and similarity metrics, each similarity metric indicating a similarity between the at least a snippet of the source code and a respective code clone.

These and other implementations can each optionally include one or more of the following features: actions further include modifying the at least a snippet of the source code based on a fix recommendation to provide modified source code; modifying the at least a snippet of the source code is automatically performed by the one or more processors in response to a similarity score associated with the fix recommendation meeting a threshold similarity score; fix recommendations in the set of fix recommendations are ranked based on respective similarity scores associated therewith; the security testing comprises static application security testing (SAST); each similarity metric is at least partially determined as an edit distance between the at least a snippet of the source code and a respective code clone; and actions further include grouping results in the set of results based on respective similarity scores.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
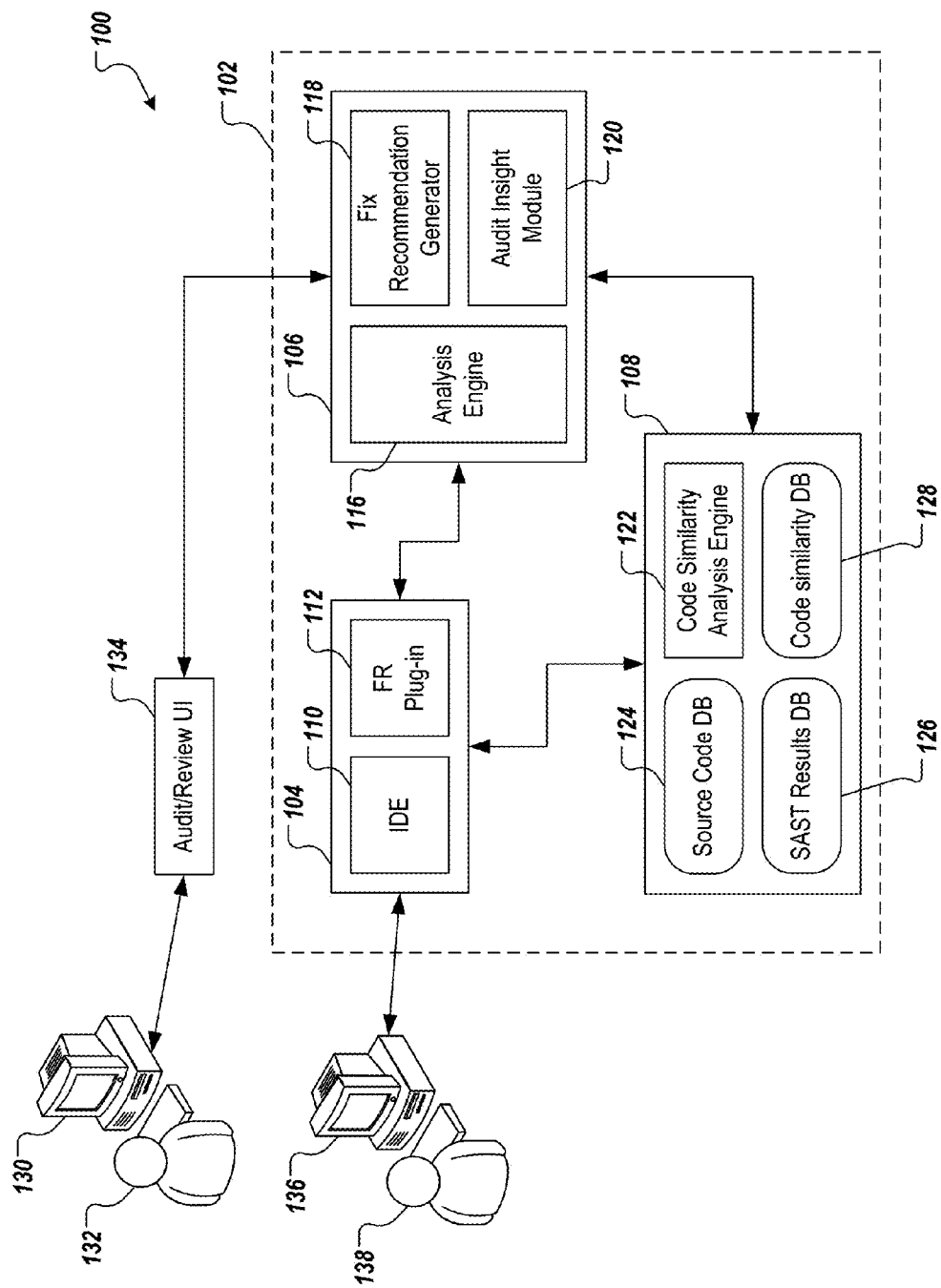
FIG. 1 depicts an example architecture in accordance with implementations of the present disclosure.

Implementations of the present disclosure are generally directed to reducing the consumption of resources required to review results of static application security testing (SAST), and attend legitimate issues raised by the SAST. In some examples, a legitimate issue is an issue that is not a false positive, and that can endanger either the security or the safety of the program, if not attended to (e.g., repaired, removed). More particularly, implementations of the present disclosure combine SAST for finding potential security issues with code similarity detection (e.g., clone detection). As described in further detail herein, implementations of the present disclosure reduce auditing effort (e.g., identifying actually problematic code (results that are not false positives)), in terms of computing resources, and human resources, by grouping flagged code (e.g., flagged as potentially problematic) based on similarity, and by presenting similar issues that had already been analyzed (e.g., during previous SAST of other code). As described in further detail herein, implementations of the present disclosure reduce repair effort (e.g., fixing actually problematic code (results that are not false positives)), in terms of computing resources, and human resources, by presenting similar issues that had already been repaired.

To provide further context for implementations of the present disclosure, and without loss of generality, SAST can be used to detect potential security vulnerabilities. SAST is a technique that statically (i.e., without actually executing a program under test) analyzes the program source code to identify potential problems. Example problems can endanger the security or safety of the program. In some examples, such problems are caused by unchecked (e.g., unvalidated) data-flows from a source to a sink. In some examples, a source is input to the program (e.g., input from a user). In some examples, a sink is an action based on input (e. g., access to a database).

The following, relatively simple example can be considered, in which user input is read from the source req.getParameter and flows into the sink SQL.exec:

```
String selectUser(HttpServletRequest req, HttpServletResponse resp) {
    String userName = req.getParameter ("fName");
    String statement = "SELECT * FROM 'users' WHERE 'name' = '"
    + userName +" ';"
    return SQL. exec(statement);
}
```

In this example, input from users is stored unchecked in the variable userName which is used for constructing a SQL query (stored in the variable statement). An example user input can include ' or '1'='1, which is copied (unmodified) into the variable userName. Consequently, the following example value is assigned to the variable statement:
    SELECT * FROM 'users ' WHERE 'name '='"+'" or '1'='1"+'";
which can be rewritten as:
    SELECT * FROM 'users ' WHERE 'name '=' or '1'='1';
which, because as '1'='1' is always true, is equivalent to:
    SELECT * FROM 'users ';

Consequently, the function returns information about all users stored in the database table users instead of only the information of the selected users. This example vulnerability is called SQL injection and is one of the main causes of security breaches in web applications, for example.

One countermeasure to ensure that only safe user input flows to the sink is to sanitize the input. In some examples, sanitizing refers to the process of checking the input for potentially problematic content (e.g., malicious content), and either removing the content or stopping further processing of the content. An example sanitizer function can include String sanitizeSQL (String in), which removes all characters (e.g., ' or ;) that might be harmful for SQL sinks from a variable. Given this example sanitizer function, the example SQL injection vulnerability discussed above can be removed as follows:

```
String selectUser (HttpServletRequest req, HttpServletResponse resp) {
    String userName = req.getParameter("fName");
    String safeUserName = sanitizeSQL(userName);
    String statement = " SELECT * FROM 'users ' WHERE 'name ' = '"
    + safeUserName +" ';"
    return SQL.exec (statement);
}
```

As a result, the input ' or '1'='1 results in the SQL query:
    SELECT * FROM 'users ' WHERE 'name '=' or 1=1 ';
which searches for a user with name or 1=1 (note the differences in the placement of the quotation marks). Most likely, this will return no information at all.

In another example, this issue can be fixed by using a so-called prepared SQL statement, which, by construction, is not vulnerable to SQL injections:

```
String selectUser (HttpServletRequest req, HttpServletResponse resp) {
    String userName = req.getParameter ("fName");
    String safeUserName = sanitizeSQL (userName);
    PreparedStatement stmt = connection.prepareStatement (
                " SELECT * FROM 'users ' WHERE 'name ' = ?");
    stmt.setString (1, userName );
    return stmt.executeQuery ( );;
}
```

Here, the type conversion that is part of the setString( ) call ensures that no SQL injection is possible.

SAST uses over-approximation at least in part due to efficiency. Such over-approximations, however, result in false positives (reported findings that are neither security nor safety relevant. For example, the following examples can be considered. In one example, the following example code is provided:

```
void fun(HttpServletRequest req, HttpServletResponse resp, int length)
        throws IOException {
    String x             = "safe";
    String x_in          = req.getParameter("fName");
    PrintWriter out      = resp.getWriter( );
    if (nodesLength > 0){
        x = x_in;
    }
    for (int i=0; i < nodesLength; i++){
        x = "safe"
    }
    SQL.exec(x);
}
```

In this example, there are (theoretically) four possibilities for a data flow between the dangerous source (req.getParameter("fName")) and the sink (SQL.exec(x)):
    nodesLength>0 is true and 0<nodesLength is true, such that x=x_in and x="safe" are executed.
    nodesLength>0 is false and 0<nodesLength is true, such that only x="safe" is executed.
    nodesLength>0 is true and 0<nodesLength is false, such that only x=x_in is executed.
    nodesLength>0 is false and 0<nodesLength is false, such that neither x=x_in nor x="safe" is executed.

In some examples, a traditional SAST tool will show all four possibilities as potential vulnerabilities while, in fact, only the first and fourth possibility can exist (for the second and third possibilities, the conditions contradict each other), and the code is safe, because the value of x at SQL.exec (x) is always the string literal "safe".

In some examples, a traditional SAST tool will report a potential insecure dataflow from req.getParameter to SQL.exec (i.e., a false positive). Further, a traditional SAST tool might create a large number of false positives for even much simpler examples than that provided above. In view of this, the findings of SAST need to be analyzed, and for each result, it needs to be decided whether the issue is real. This process is resource intensive, and requires a high skill level (as well as a high trust in the person doing the analysis), because marking a finding as a false positive immediately dismisses it from any fix list, leaving potential for serious vulnerabilities to be shipped to customers. Further, SAST is again performed after changes are implemented.

Similarly, fixing issues is also a time-consuming, resource intensive process that requires significant expertise. Consider the following example code:

```
void fun(HttpServletRequest req, HttpServletResponse resp, int length)
        throws IOException {
    String x       = "safe";
    String x_in    = req.getParameter("fName");
    PrintWriter out = resp.getWriter( );
    if (nodesLength > 0){
        x = x_in;
    }
    for (int i= 1; i < nodesLength; i++){
        x = "safe"
    }
    SQL.exec(x);
}
```

As compared to the earlier example, the initialization of the for-loop is changed (for (int i=1; i<nodesLength; i++){ ). In this example, the code is now vulnerable to a SQL injection if nodesLength is 1. Fixing this issue requires a deep understanding of the program (both, on a technical level as well as its business purpose), a solid understanding of secure programming, as well as knowledge about the recommended fix instructions (e.g., sanitation functions) either based on organizational or industry-accepted standards.

In this example, there are at least four different options that need to be considered while fixing the security issue:
  A sanitizer could be inserted right at the beginning of the function (e.g., after String x="safe";). Selecting the correct sanitation function(s) depends on the possible inputs, the sink, as well as the use context.
  A sanitizer could be inserted right before the sink (e.g., before SQL.exec (x);). Selecting the correct sanitation function(s) depends on the possible inputs, the sink, as well as the use context.
  Instead of using a simple SQL.exe function, a prepared statement (which is secure, if used properly) could be used.
  The initialization of the for-loop could be wrong (also resulting in a functional bug). Thus, changing the initialization to int i=0 could, indeed, be the preferable fix recommendation.

In view of the above context, implementations of the present disclosure provide code similarity analysis (also referred to as code similarity detection, and/or clone analysis). In some implementations, code similarity analysis finds similar code fragments (so-called clones). In some examples, similar code can result from code reuse (e.g., developers copying code and then adapting the code to fit a different purpose or context). In accordance with implementations of the present disclosure, code clones can be ordered (ranked) based on a degree of change between respective code clones and the source code, for which the code clones are being sought. In some examples, the degree of change can be determined based on example differences, such as, renaming of identifiers (e.g., constants, variables), rearranging of statements, inserting, deleting, modifying statements, re-factoring of code snippets into separate functions within the same class or compilation unit, and/or re-factoring of code snippets or functions into different (or newly created) classes or compilation units.

In some implementations, a degree of difference between a source code (e.g., a snippet of code) and another source code (e.g. potential clone code) can be determined based on an edit distance between the two. In some examples, the edit distance is determined as the smallest number of statements that need to be inserted and/or deleted, as well as modified (e.g., as a pair of delete/insert operations) to transform one piece of code into another. For example, given a reference source code a and two clones a' and a"; n' can be provided as the smallest number of insert/delete operations that are necessary to transform a into a', and n" can be provided as the smallest number of insert/delete operations that are necessary to transform a into a". In some examples, if n'<n", then a' is more similar to a than a" is to a. In some examples, the edit distance between two identical pieces of code is 0. In some implementations, the edit distance determination can exclude insert/delete operations for fixing vulnerabilities (e.g., the edit distance determination does not account the insertion of a sanitization function).

To illustrate ordering based on degrees of difference with respective code clones, the following example listing can be considered:

Listing 1: Source Code

```
private static
void sort(int[ ] a) {
    System.out.println (
        Arrays.toString (a));
    for (int i = 1;
            i < a.length;
            i++) {
        int v = 0;
        v = a[i];
        int j = 0;
        j = i;
        while (j > 0
                && a[j -1] > v)
        {
            a[j] = a[j -1];
            j --;
        }
        a[j] = v;
    }
    System.out.println (
        Arrays.toString (a));
}
```

In some examples, Listing 1 includes example source code, for which code clones are being sought. The following example listings can be considered:

Listing 2: First Example Code Clone

```
private static
void sort(int[ ] x) {
    System.out.println (
        Arrays.toString (x));
    for (int i = 1;
            i < a.length;
            i++) {
        int v = 0;
        y = x[i];
        int j = 0;
        j = i;
        while (j > 0
                && x[j -1] > y)
        {
            x[j] = x[j -1];
            j --;
        }
        x[j] = y;
```

Listing 2: First Example Code Clone

```
        }
        System.out.println (
            Arrays.toString (a));
    }
```

Listing 3: Second Example Code Clone

```
    private static
    void sort(int[ ] x) {
        for (int i = 1;
            i < a.length;
            i++) {
            int v = 0;
            y = x[i];
            int j = 0;
            j = i;
            while (j > 0
                && x[j -1] > y)
            {
                x[j] = x[j -1];
                j --;
            }
            x[j] = y;
        }
    }
```

In this example, Listings 2 and 3 can be said to be code clones of Listing 1. In some examples, the code of Listing 2 is a relatively simple modification of the code of Listing 1 (e.g., renaming of identifiers), while the code of Listing 3 is a more complex modification of the code of Listing 1 (e.g., several statements are deleted, inserted or modified). In some examples, code similarity analysis can be conducted to determine respective similarity metrics for Listing 2 and Listing 3. In some examples, the respective similarity metrics can indicate that Listing 2 is more similar to Listing 1 than Listing 3 is to Listing 1.

FIG. 1 depicts an example architecture 100 that can be used to realize implementations of the present disclosure. In accordance with implementations of the present disclosure, the example architecture 100 integrates static code analysis and code similarity analysis. In the depicted example, the architecture 100 includes a system 102 that includes a development component 104, a static analysis component 106, and a code similarity component 108.

In some examples, the development component 104 is the principal user interface for developers. For example, developers can interact with the development component 104 to create, debug, and/or modify source code. In some examples, developers can use the development component 104 to initiate a static analysis (SAST) of the source code to identify (potential) security vulnerabilities. The development component 104 includes an integrated development environment (IDE) 110, and a fix recommendation (FR) plug-in 112. In some examples, developers interact with the IDE 110 to create/modify/debug the source code. Among other functionality, the IDE 110 provides syntax highlighting, and enables static analysis (SAST), as described herein. In some examples, the FR plug-in 112 is a plug-in to the development environment 104, and provides, among other features, fix recommendations based on already fixed issues for the same vulnerability in similar code (e.g., code clones), as described herein.

In the depicted example, the static analysis component 106 includes an analysis engine 116, a fix recommendation generator 118, and an audit insight module 120. In some examples, the analysis engine 116 performs SAST to statically analyze a program under test. Among others features, static analysis (SAST) control- and data-flow analyses, provides an abstract control-flow (provided as a data structure), and an abstract data-flow (provided as a data structure) of the program under test. These data structures are analyzed by the analysis engine 116 for potential security vulnerabilities. In some examples, the fix recommendation generator 118 reference the code similarity component 108 to find issues (identified based on the SAST) with similar coding patterns that had already been fixed. Based on this information, the fix recommendation generator 118 provides a fix recommendation that can be presented (e.g., to the developer). In some examples, the audit insight module 120 provides information for grouping issues (identified based on the SAST) based on their code similarity as well as enabling already audited findings to be ranked by their code similarities (respective similarities to the program under test).

In the depicted example, the code similarity component 108 includes a code similarity analysis engine 122, a source code repository 124, a SAST results repository 126, and a code similarity repository 128. In some examples, the code similarity analysis engine 122 processes one or more heuristics (e.g., clone detection) to partition source code into sub-parts, which can be referred to as snippets. Example snippets can include extracting functions, and single code blocks. In some examples, the code similarity analysis engine 122 determines a similarity ranking between snippets. In some examples, the source code repository 124 is provided as a (versioned) computer-readable storage (e.g., file system, database) that stores the source code. In some examples, the source code repository 124 enables read/write of the source code, and in some examples, access different versions (e.g., a history) of the source code. In some examples, the SAST results repository 126 is provided as a (versioned) computer-readable storage (e.g., file system, database) that stores the results of the security code analysis (SAST), as well as audit results. In some examples, the SAST results repository 126 tracks the development of the code and the results of rescanning (e.g., repeated SAST scans as issues are fixed). In some examples, the code similarity repository 128 is provided as a (versioned) computer-readable storage (e.g., file system, database) that stores the results of the similarity analyses. In some examples, the code similarity repository 128 supports searching for similar code fragments based on a code fragment that is provided as input. This information can referenced to (linked to) the various code versions stored in the source code repository 124.

The example architecture 100 includes client devices 130, 136 that can be used by respective users 132, 138 to interact with the system 102. In some examples, the system 102 is provided as a back-end system (e.g., server-side system). For example, the client devices 130, 136 are communicably connected to the system 102 by a network (not shown). In some examples, the client devices 130, 136 can each be a computing device such as a laptop computer, a desktop computer, a smartphone, a personal digital assistant, a portable media player, a tablet computer, or any other appropriate computing device that can be used to communicate with the system 102. In some examples, the system 102 can include one or more computing devices, such as a server, and one or more database systems. In some examples, the system 102 can represent more than one computing device working together to perform the actions of a server (e.g., cloud computing). In some examples, the network can be a public communication network (e.g., the Internet, cellular data network, dialup modems over a telephone network), a wide area network (WAN), a local area network (LAN), a private communications network (e.g., private LAN, leased lines), or any appropriate combination thereof.

In some implementations, the user 138 can include a developer, who interacts with the development environment 104 to create/modify/debug source code. In some examples, the user 132 can include an auditor that can interact with the static analysis component 106 to perform analysis, and fixing of a program under test. In the depicted example, an audit/review UI 134 is provided, through which the user 132 (through the computing device 130) can interact with the static analysis component 106. In some examples, the audit/review UI 134 is provided as a dedicated user interface for security experts that enables security experts to review results of the static analysis together with the underlying coding. For example, the audit/review UI 134 can be displayed by the computing device 130.

FIGS. 2-5 depict example sequence diagrams in accordance with implementations of the present disclosure.

Figure 2:
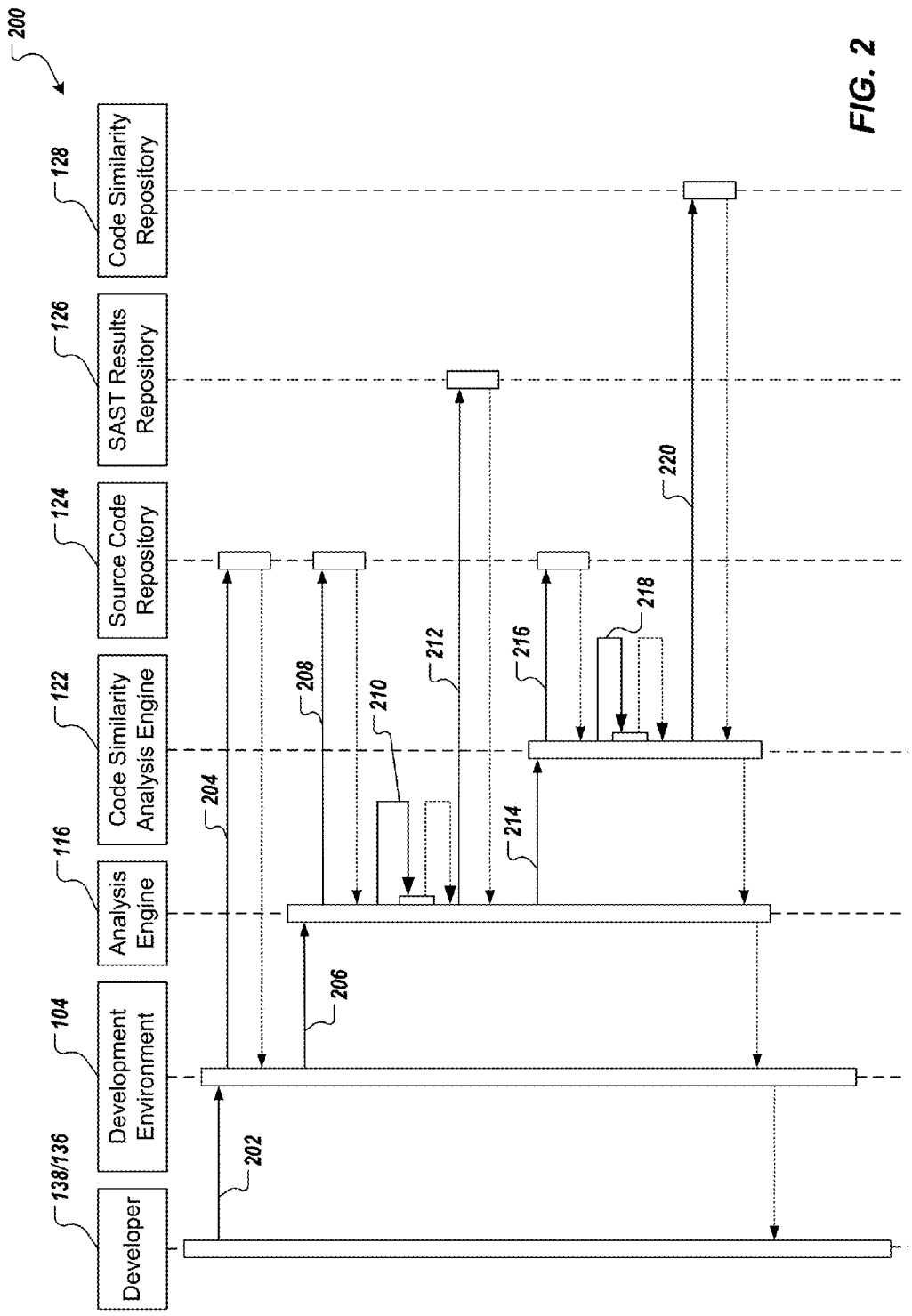
FIGS. 2-5 depict example sequence diagrams in accordance with implementations of the present disclosure.

FIG. 2 depicts an example sequence diagram 200 depicting an example sequence for source code analysis. In accordance with implementations of the present disclosure, the example sequence of the sequence diagram 200 performs a combined SAST and code similarity analysis. In some examples, this process can be initiated by a developer (build expert, or an automated build) or a security expert. In the depicted example, the process is initiated by a developer (e.g., from a development environment).

The developer 138 (using the computing device 136) requests (202) the development environment 104 to initiate scan of source code that the developer 138 is working on. In some examples, and to ensure consistency, the development environment 104 stores (204) the current version of the source code in the source code repository 124. The development environment 104 requests (206) source code analysis by the analysis engine 116. In response to the request, the analysis engine 116 retrieves (208) the current version of the source code from the source code repository 124.

The analysis engine 116 executes (210) the combined SAST and code similarity analysis (e.g., clone detection). In some examples, SAST is executed to provide one or more results (potential security issues). The analysis engine 116 stores (212) the results in the SAST results repository 126. The analysis engine 116 requests (214) code similarity information from the code similarity analysis engine 122. The code similarity analysis engine 122 retrieves (216) the source code from the source code repository 124. The code similarity analysis engine 122 determines (218) similarity scores between the source code (or snippets thereof) relative to previously analyzed source code (or snippets thereof) to provide a plurality of similarity scores, which can be used to identify and rank code clones. The code similarity analysis engine 122 stores (220) results of the code similarity analysis in the code similarity repository 128.

Figure 3:
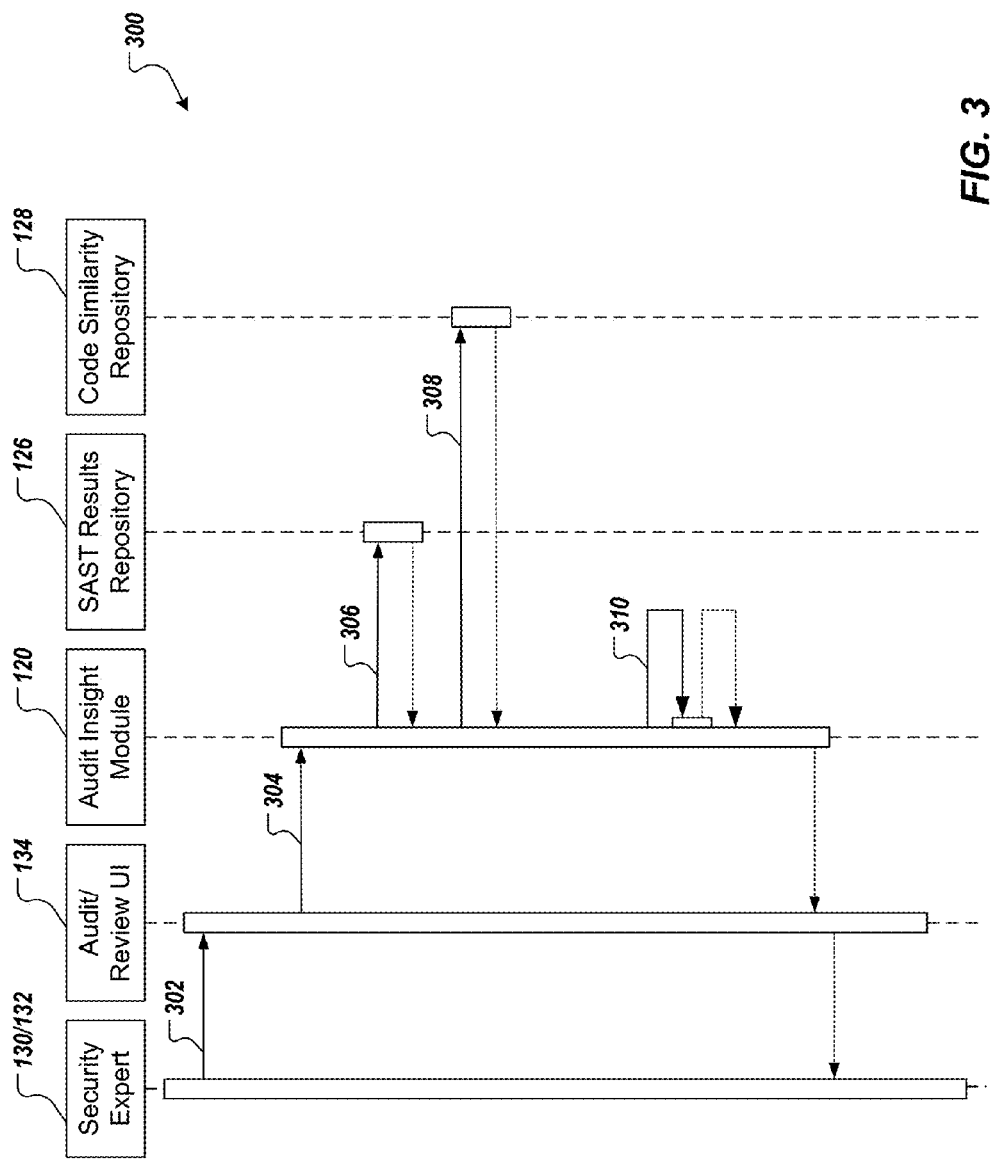

FIG. 3 depicts an example sequence diagram 300 depicting an example sequence for grouping results (SAST results) based on code similarity. In some examples, the security expert 132 (using the computing device 130) interacts (302) (e.g., provides input to) with the audit/review UI 134, which requests (304) grouping of results based on code similarity from the audit insight module 120. The audit insight module 120 retrieves (306) results (of the SAST analysis for the source code in question) from the SAST results repository 126. The audit insight module 120 retrieves (308) code similarity information (for the source code in question) from the code similarity repository 128. The audit insight module 120 processes (310) the information to group testing results (SAST results) based on the similarity scores. In some examples, groupings can be based on multiple criteria (e.g., in addition to the code similarity). In some examples, the common weakness enumerations (CWEs), the file or packages, and/or identical sources or sinks can be used for all or some findings.

Figure 4:
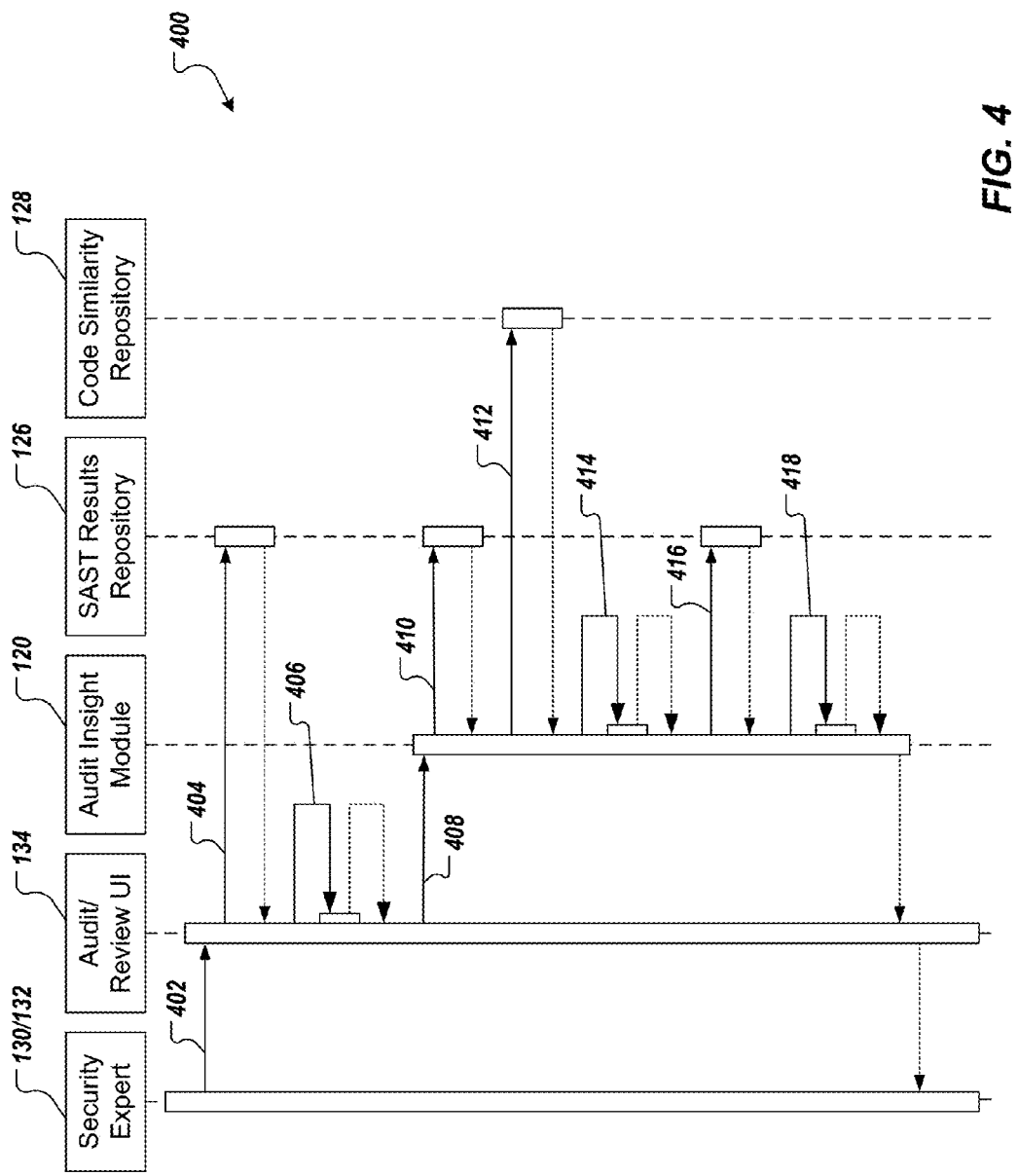

FIG. 4 depicts an example sequence diagram 400 depicting an example sequence for recommendations based on code similarity. In some examples, the sequence 400 is initiated by a security expert, or a developer (e.g., using the audit/review UI 134, or the development environment 104). The example of FIG. 4 depicts the security expert 132 (using the computing device 130) interacts (402) (e.g., provides input to) with the audit/review UI 134, which retrieves (404) results (of the SAST analysis for the source code in question) from the SAST results repository 126. In some examples, the security expert 132 interacts with the audit/review UI 134 to select (406) a result that is to be investigated (a result, for which recommendations are to be made). In some examples, the security expert 132 uses the audit/review UI 134 to request (408) one or more recommendations from the audit insight module 120 based on the audit of similar issues previously addressed (either by the security expert 132, or a different person).

The audit insight module 120 retrieves (410) results (SAST results for the program in question) from the SAST results repository 126. The audit insight module 120 retrieves (412) similar code for from the code similarity repository 128. In some examples, the similar code is retrieved based on a similarity threshold (e.g., all code snippets with an edit distance smaller than a user selected value t (the threshold). In an iterative process starting with the most similar code snippets (code clones), e.g., first all code snippets with an edit distance smaller t and in a next step, all with an edit distance of t+1 (and so forth). The audit insight module 120 ranks (414) code clones based on respective similarity scores. That is, the code clones are ordered based on similarity to the source code, for which the selected result was reported. The audit insight module 120 retrieves (416) audit results for the similar code (e.g., code clones) from the SAST results repository 126. In some examples, the audit insight module 120 loads all audit results of the same type (e.g., CWE). A list of code snippets that are similar to the source code underlying the selected result is provided, and includes an audited result of the same type. The audit insight module 120 ranks (418) items in the list based on the code similarity as well as similarity of the result (e.g., source, sinks).

Figure 5:
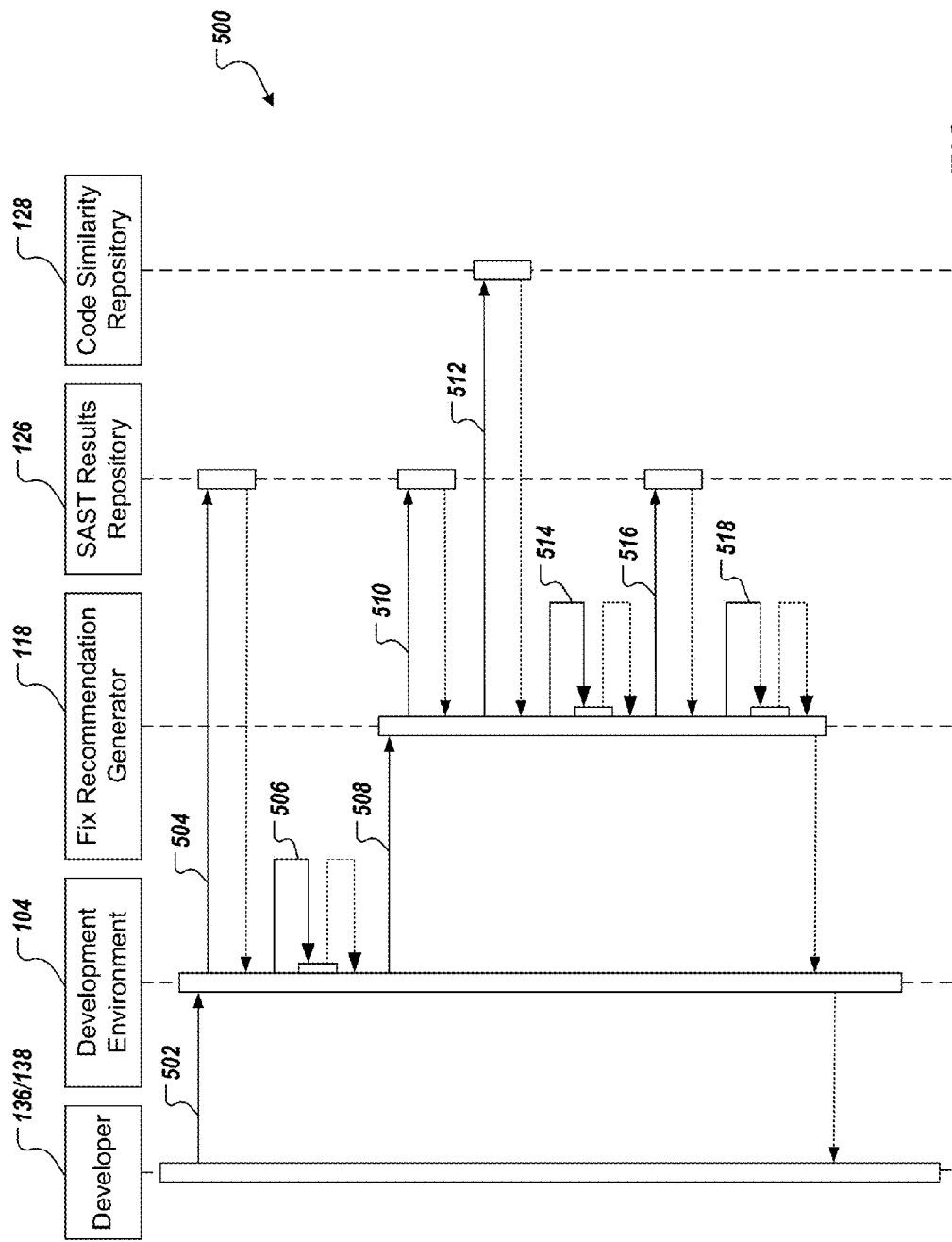

FIG. 5 depicts an example sequence diagram 500 depicting an example sequence for recommended fixes based on code similarity. In the depicted example, the developer 138 (using the computing device 136) interacts (502) with the development environment 104 to initiate fixing of results (e.g., potential code vulnerabilities). The development environment 104 retrieves (504) audited results from the SAST results repository 126. In some examples, the developer 138 selects a result (or code component) that is to be fixed. The development environment 104 requests (508) a recommendation for the selected results (or code component) from the fix recommendation generator 118, which retrieves (510) the source code for the selected result (or code component) from the SAST results repository 126. The fix recommendation generator 118 queries (512) the code similarity repository

128 to access code that is similar to the code that is to be fixed. In some examples, this selection can either be threshold based, or iteratively.

The fix recommendation generator 118 retrieves (516) fixed results for the same types in similar code from the SAST results repository 126. That is, for similar source code, previously fixed issues are retrieved. From the set of similar code, source code that contains fixed issues of the same type is selected and ranked (518) based on similarity. To provide a list of one or more fix recommendations (e.g., previously audited code with respective fixes). In some examples, the list of one or more fix recommendations is displayed to the developer 138, which can select a recommendation for fixing the source code in question. In some examples, a fix recommendation can automatically be selected and the source code fixed based thereon. For example, if a similarity score of a fix recommendation meets a threshold, the fix recommendation can be automatically implemented (e.g., by the development environment 104) to fix the source code in question. For example, the same fix (e.g., sanitizer) can be added at the same location within the source code.

Figure 6:
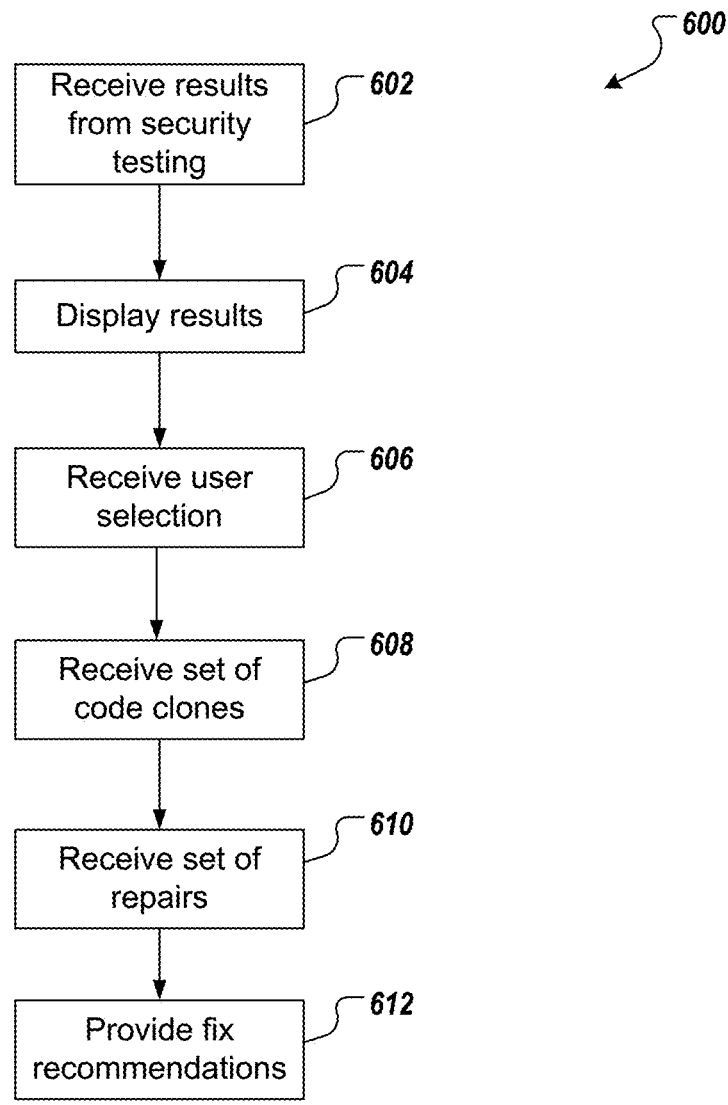
FIG. 6 depicts an example process that can be executed in accordance with implementations of the present disclosure.

FIG. 6 depicts an example process 600 that can be executed in accordance with implementations of the present disclosure. In some examples, the example process 600 can be provided as one or more computer-executable programs executed using one or more computing devices.

Results from security testing of source code are received (602). For example, the development environment 104 receives results from the SAST results repository 126. In some examples, each result indicates a potential security vulnerability of the source code. In some examples, the results are provided by executing SAST on the source code. Graphical representations of the results are displayed to a user (604). For example, the development environment 104, or the audit/review UI 134 displays the results. User input indicating a result of the results is received (606). For example, the user selects a result to be reviewed through the development environment 104, or the audit/review UI 134. In some examples, the selected result is received by the fix recommendation generator 118.

A set of code clones is received (608). For example, the fix recommendation generator 118 receives the set of code clones from the code similarity repository 128. In some examples, each code clone is provided based on at least a snippet of the source code underlying the result. A set of repairs is received (610). For example, the fix recommendation generator 118 receives the set of repairs from the SAST results repository 126. In some examples, each repair is associated with a code clone, and mitigates a previously determined security vulnerability. A set of fix recommendations is provided (612). For example, the fix recommendation generator 118 provides the set of fix recommendations. In some examples, the set of fix recommendations is provided based on the set of code clones, the set of repairs, and similarity metrics, each similarity metric indicating a similarity between the at least a snippet of the source code and a respective code clone.

Figure 7:
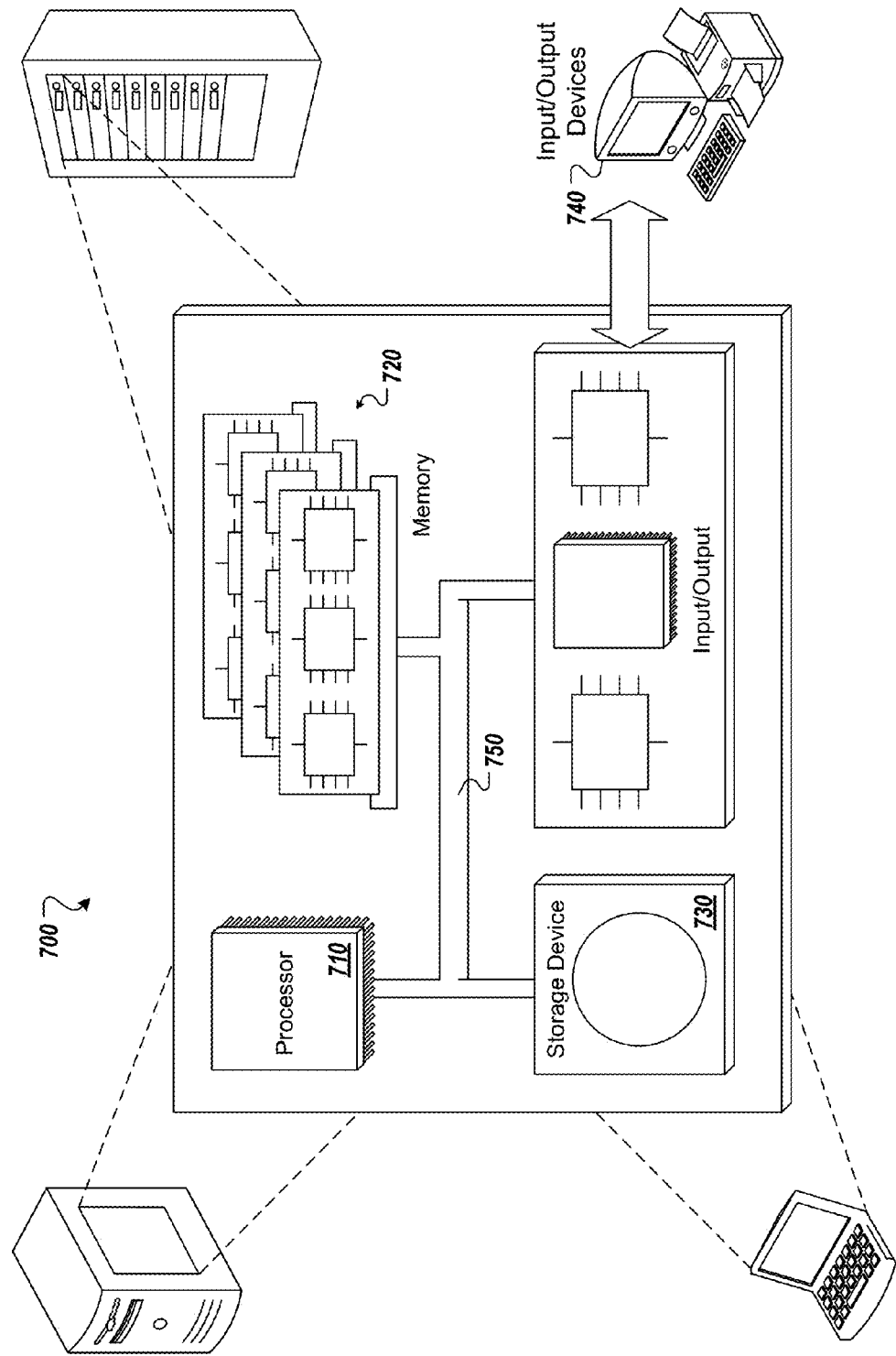
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for modifying source code, the method being executed using one or more processors and comprising:
   receiving, by the one or more processors, results from a static application security testing of the source code, each result indicating a potential security vulnerability of the source code caused by unchecked data-flows of the source code, the results being grouped based on respective similarity scores and at least one additional criterion;
   displaying, by the one or more processors, graphical representations of the results to a user;
   receiving, by a fix recommendation generator, user input indicating a result of the results;
   receiving, by the fix recommendation generator, a set of code clones, each code clone being provided based on a degree of difference determined based on at least a snippet of the source code underlying the result, the degree of difference comprising the smallest number of operations that transform a respective code clone into the source code and excluding repair operations of the respective code clone;
   receiving, by the fix recommendation generator, a set of repairs, each repair being associated with a code clone, and mitigating a previously determined security vulnerability;
   providing, by the fix recommendation generator, a set of fix recommendations based on the set of code clones, the set of repairs, and similarity metrics, each similarity metric being associated to the degree of difference and indicating a similarity between the at least a snippet of the source code and the respective code clone; and
   modifying, by the one or more processors, the source code based on the set of fix recommendations, the set of fix recommendations reducing a repair effort of the source code by minimizing computing resources.

2. The method of claim 1, further comprising modifying the at least a snippet of the source code based on a fix recommendation to provide modified source code.

3. The method of claim 2, wherein modifying the at least a snippet of the source code is automatically performed by the one or more processors in response to a similarity score associated with the fix recommendation meeting a threshold similarity score.

4. The method of claim 1, wherein fix recommendations in the set of fix recommendations are ranked based on respective similarity scores associated therewith.

5. The method of claim 1, wherein the static application security testing comprises an analysis of the source code without actually executing the source code.

6. The method of claim 1, wherein each similarity metric is at least partially determined as an edit distance between the at least a snippet of the source code and a respective code clone.

7. The method of claim 1, wherein the additional criterion is based on one of common weakness enumerations, source identifiers and sink identifiers.

8. A non-transitory computer-readable storage medium coupled to one or more processors and having instructions stored thereon which, when executed by the one or more processors, cause the one or more processors to perform operations for modifying source code, the operations comprising:
   receiving results from a static application security testing of the source code, each result indicating a potential security vulnerability of the source code caused by unchecked data-flows of the source code, the results being grouped based on respective similarity scores and at least one additional criterion;
   displaying graphical representations of the results to a user;
   receiving, by a fix recommendation generator, user input indicating a result of the results;
   receiving, by the fix recommendation generator, a set of code clones, each code clone being provided based on a degree of difference determined based on at least a snippet of the source code underlying the result, the degree of difference comprising the smallest number of operations that transform a respective code clone into the source code and excluding repair operations of the respective code clone;
   receiving, by the fix recommendation generator, a set of repairs, each repair being associated with a code clone, and mitigating a previously determined security vulnerability;
   providing, by the fix recommendation generator, a set of fix recommendations based on the set of code clones, the set of repairs, and similarity metrics, each similarity metric being associated to the degree of difference and indicating a similarity between the at least a snippet of the source code and the respective code clone; and
   modifying, by the one or more processors, the source code based on the set of fix recommendations, the set of fix recommendations reducing a repair effort of the source code by minimizing computing resources.

9. The computer-readable storage medium of claim 8, wherein operations further comprise modifying the at least a snippet of the source code based on a fix recommendation to provide modified source code.

10. The computer-readable storage medium of claim 9, wherein modifying the at least a snippet of the source code is automatically performed by the one or more processors in response to a similarity score associated with the fix recommendation meeting a threshold similarity score.

11. The computer-readable storage medium of claim 8, wherein fix recommendations in the set of fix recommendations are ranked based on respective similarity scores associated therewith.

12. The computer-readable storage medium of claim 8, wherein the static application security testing comprises an analysis of the source code without actually executing the source code.

13. The computer-readable storage medium of claim 8, wherein each similarity metric is at least partially determined as an edit distance between the at least a snippet of the source code and a respective code clone.

14. The computer-readable storage medium of claim 8, wherein the additional criterion is based on one of common weakness enumerations, source identifiers and sink identifiers.

15. A system, comprising:
a client-side computing device;
and a computer-readable storage device coupled to the client-side computing device and having instructions stored thereon which, when executed by the client-side computing device, cause the client-side computing device to perform operations for modifying source code, the operations comprising:
receiving results from a static application security testing of the source code, each result indicating a potential security vulnerability of the source code caused by unchecked data-flows of the source code, the results being grouped based on respective similarity scores and at least one additional criterion;
displaying graphical representations of the results to a user; receiving, by a fix recommendation generator, user input indicating a result of the results;
receiving, by the fix recommendation generator, a set of code clones, each code clone being provided based on a degree of difference determined based on at least a snippet of the source code underlying the result, the degree of difference comprising the smallest number of operations that transform a respective code clone into the source code and excluding repair operations of the respective code clone;
receiving, by the fix recommendation generator, a set of repairs, each repair being associated with a code clone, and mitigating a previously determined security vulnerability;
providing, by the fix recommendation generator, a set of fix recommendations based on the set of code clones, the set of repairs, and similarity metrics, each similarity metric being associated to the degree of difference and indicating a similarity between the at least a snippet of the source code and the respective code clone; and
modifying the source code based on the set of fix recommendations, the set of fix recommendations reducing a repair effort of the source code by minimizing computing resources.

16. The system of claim 15, wherein operations further comprise modifying the at least a snippet of the source code based on a fix recommendation to provide modified source code.

17. The system of claim 16, wherein modifying the at least a snippet of the source code is automatically performed by the one or more processors in response to a similarity score associated with the fix recommendation meeting a threshold similarity score.

18. The system of claim 15, wherein fix recommendations in the set of fix recommendations are ranked based on respective similarity scores associated therewith.

19. The system of claim 15, wherein the static application security testing comprises an analysis of the source code without actually executing the source code.

20. The system of claim 15, wherein each similarity metric is at least partially determined as an edit distance between the at least a snippet of the source code and a respective code clone.

* * * * *